(12) United States Patent
Aoki

(10) Patent No.: US 12,476,437 B2
(45) Date of Patent: Nov. 18, 2025

(54) VERTICAL CAVITY SURFACE EMITTING LASER

(71) Applicant: Sumitomo Electric Industries, Ltd., Osaka (JP)

(72) Inventor: Takeshi Aoki, Osaka (JP)

(73) Assignee: Sumitomo Electric Industries, Ltd., Osaka (JP)

(*) Notice: Subject to any disclaimer, the term of this patent is extended or adjusted under 35 U.S.C. 154(b) by 509 days.

(21) Appl. No.: 17/963,336

(22) Filed: Oct. 11, 2022

(65) Prior Publication Data

US 2023/0163568 A1 May 25, 2023

(30) Foreign Application Priority Data

Nov. 24, 2021 (JP) ................. 2021-190050

(51) Int. Cl.
*H01S 5/183* (2006.01)

(52) U.S. Cl.
CPC ...... *H01S 5/18361* (2013.01); *H01S 5/18311* (2013.01); *H01S 5/18333* (2013.01); *H01S 2301/166* (2013.01)

(58) Field of Classification Search
CPC ............ H01S 5/18311; H01S 5/18333; H01S 5/18361
See application file for complete search history.

(56) References Cited

U.S. PATENT DOCUMENTS

| 6,658,040 B1* | 12/2003 | Hu ................. H01S 5/18311 372/96 |
| 11,031,752 B2* | 6/2021 | Hamaguchi ........... H01S 5/2063 |
| 2018/0278022 A1 | 9/2018 | Li et al. |
| 2020/0321754 A1* | 10/2020 | Hegblom ............ H01S 5/18341 |
| 2020/0403377 A1* | 12/2020 | Wu ................... H01S 5/18347 |
| 2023/0146906 A1* | 5/2023 | Watanabe ............ H01S 5/1833 372/46.013 |

FOREIGN PATENT DOCUMENTS

| CN | 112310810 A | 2/2021 |
| JP | 2002-111051 A | 4/2002 |
| JP | 2018-160650 A | 10/2018 |

OTHER PUBLICATIONS

Haglund, E.; Haglund, Å.; Gustavsson, J. et al. (2012) "Reducing the spectral width of highspeed oxide confined VCSELs using an integrated mode filter". Vertical-Cavity Surface-Emitting Lasers Xvi, vol. 8276 pp. Article No. 82760L.

* cited by examiner

*Primary Examiner* — James A Menefee
(74) *Attorney, Agent, or Firm* — Volpe Koenig

(57) ABSTRACT

A vertical cavity surface emitting laser includes a post provided at a major surface of a substrate and extending along a first axis intersecting the major surface of the substrate, and an electrode provided at an upper surface of the post and surrounding the first axis. The post includes a first distributed Bragg reflector, an active layer, a current confinement layer, and a second distributed Bragg reflector. The substrate, the first distributed Bragg reflector, the active layer, the current confinement layer, and the second distributed Bragg reflector are disposed in order in a direction of the first axis.

5 Claims, 7 Drawing Sheets

VERTICAL CAVITY SURFACE EMITTING LASER

CROSS REFERENCE TO RELATED APPLICATIONS

This application claims priority based on Japanese Patent Application No. 2021-190050 filed on Nov. 24, 2021, and the entire contents of the Japanese patent application are incorporated herein by reference.

TECHNICAL FIELD

The present disclosure relates to a vertical cavity surface emitting laser.

BACKGROUND

Patent Document 1 discloses a vertical cavity surface emitting laser including a substrate, a lower distributed Bragg reflector provided on the substrate, an active layer provided on the lower distributed Bragg reflector, and an upper distributed Bragg reflector provided on the active layer. The vertical cavity surface emitting laser includes a light emitting region including an active layer and a high-resistance region located around the light emitting region. The high-resistance region extends from the upper surface of the upper distributed Bragg reflector to the active layer.
[Patent Document 1] Japanese Unexamined Patent Application Publication No. 2002-111051

SUMMARY

A vertical cavity surface emitting laser according to one aspect of the present disclosure includes a post provided at a major surface of a substrate and extending along a first axis intersecting the major surface of the substrate, and an electrode provided at an upper surface of the post and surrounding the first axis. The post includes a first distributed Bragg reflector, an active layer, a current confinement layer, and a second distributed Bragg reflector. The substrate, the first distributed Bragg reflector, the active layer, the current confinement layer, and the second distributed Bragg reflector are disposed in order in a direction of the first axis. The second distributed Bragg reflector includes a semiconductor region and a high-resistance region surrounding the semiconductor region. The high-resistance region has an electrical resistance that is higher than an electrical resistance of the semiconductor region. The current confinement layer includes an aperture portion and an oxidized portion surrounding the aperture portion. The first axis passes through the semiconductor region and the aperture portion. A length of a longest line segment of line segments connecting any two points on an inner edge of the oxidized portion in a section orthogonal to the first axis is D1, a length of a longest line segment of line segments connecting any two points on an inner edge of the high-resistance region in the section orthogonal to the first axis is D2, and a value of D2/D1 is greater than 1 and is 2.5 or less.

DETAILED DESCRIPTION OF THE PREFERRED EMBODIMENTS

Figure 1:
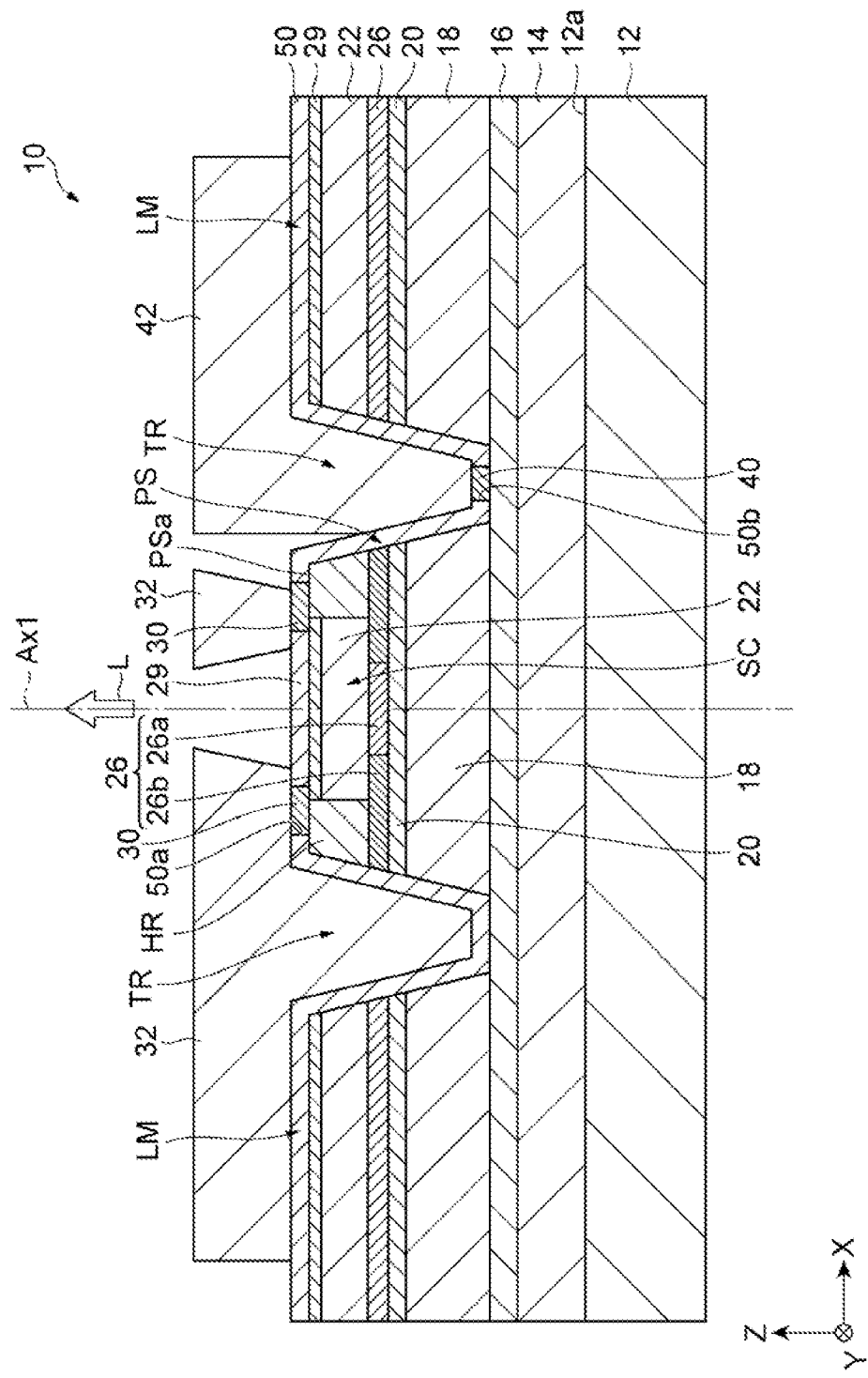
FIG. 1 is a schematic cross-sectional view of a vertical cavity surface emitting laser according to an embodiment.

In some cases, a current is confined by using a current confinement layer including an aperture portion and an oxidized portion surrounding the aperture portion. Typically, the refractive index of the oxidized portion is less than the refractive index of the aperture portion, so some light is confined within the aperture portion. However, since the current confinement layer is relatively thin, an optical electric field of a transverse mode (particularly, a higher-order mode) may leak out of the aperture portion. In this case, the spectrum width of light emitted from the vertical cavity surface emitting laser is increased.

The present disclosure provides a vertical cavity surface emitting laser capable of emitting light having a smaller spectrum width.

DESCRIPTION OF EMBODIMENTS OF THE PRESENT DISCLOSURE

A vertical cavity surface emitting laser according to an embodiment includes a post provided at a major surface of a substrate and extending along a first axis intersecting the major surface of the substrate, and an electrode provided at an upper surface of the post and surrounding the first axis. The post includes a first distributed Bragg reflector, an active layer, a current confinement layer, and a second distributed Bragg reflector. The substrate, the first distributed Bragg reflector, the active layer, the current confinement layer, and the second distributed Bragg reflector are disposed in order in a direction of the first axis. The second distributed Bragg reflector includes a semiconductor region and a high-resistance region surrounding the semiconductor region. The high-resistance region has an electrical resistance that is higher than an electrical resistance of the semiconductor region. The current confinement layer includes an aperture portion and an oxidized portion surrounding the aperture portion. The first axis passes through the semiconductor region and the aperture portion. A length of a longest line segment of line segments connecting any two points on an inner edge of the oxidized portion in a section orthogonal to the first axis is D1, a length of a longest line segment of line segments connecting any two points on an inner edge of the high-resistance region in the section orthogonal to the first axis is D2, and a value of D2/D1 is greater than 1 and is 2.5 or less.

According to the vertical cavity surface emitting laser, it is possible to reduce the distance between the inner edge of the oxidized portion and the inner edge of the high-resistance region in the direction orthogonal to the first axis. Since the high-resistance region absorbs light more easily than the semiconductor region, it is possible to absorb a transverse mode (particularly, a higher-order mode) generated at a position away from the first axis. The transverse mode increases a spectrum width of light emitted from the vertical cavity surface emitting laser. Therefore, according to the vertical cavity surface emitting laser, light having a smaller spectrum width can be emitted.

The value of D2/D1 may be 1.1 or greater. In this case, it is possible to prevent the distance between the inner edge of the oxidized portion and the inner edge of the high-resistance region from becoming excessively small. Therefore, the fundamental mode generated at a position of the first axis or a position close to the first axis can be prevented from being absorbed by the high-resistance region.

The value of D1 may be from 4 μm to 7 μm. In this case, the aperture portion having a desired size can be obtained.

In a direction orthogonal to the first axis, a distance between the inner edge of the oxidized portion and the inner edge of the high-resistance region may be 3 μm or less. In this case, the spectrum width can be reduced.

The high-resistance region may be a first high-resistance region. The second distributed Bragg reflector may include a second high-resistance region having an electrical resistance that is higher than the electrical resistance of the semiconductor region. The second high-resistance region may surround the semiconductor region. The second high-resistance region may be disposed between the electrode and the first high-resistance region in the direction of the first axis. The second high-resistance region may have an inner edge that is positioned farther away than an inner edge of the first high-resistance region from the first axis in the direction orthogonal to the first axis. The first high-resistance region and the second high-resistance region respectively may have a first thickness and a second thickness along the direction of the first axis. The second thickness may be smaller than the first thickness. In this case, since the second high-resistance region is positioned farther away from the first axis, the conduction area between the electrode and the semiconductor region can be increased.

A vertical cavity surface emitting laser according to an embodiment includes a post provided at a major surface of a substrate and extending along a first axis intersecting the major surface of the substrate, and an electrode provided at an upper surface of the post and surrounding the first axis. The post includes a first distributed Bragg reflector, an active layer, a current confinement layer, and a second distributed Bragg reflector. The substrate, the first distributed Bragg reflector, the active layer, the current confinement layer, and the second distributed Bragg reflector are disposed in order in a direction of the first axis. The second distributed Bragg reflector includes a semiconductor region and a high-resistance region surrounding the semiconductor region. The high-resistance region has an electrical resistance that is higher than an electrical resistance of the semiconductor region. The current confinement layer includes an aperture portion and an oxidized portion surrounding the aperture portion. The first axis passes through the semiconductor region and the aperture portion. In a direction orthogonal to the first axis, a distance between an inner edge of the oxidized portion and an inner edge of the high-resistance region is 3 μm or less.

According to the vertical cavity surface emitting laser, it is possible to reduce the distance between the inner edge of the oxidized portion and the inner edge of the high-resistance region in the direction orthogonal to the first axis. Since the high-resistance region absorbs light more easily than the semiconductor region, it is possible to absorb a transverse mode (particularly, a higher-order mode) generated at a position away from the first axis. The transverse mode increases a spectrum width of light emitted from the vertical cavity surface emitting laser. Therefore, according to the vertical cavity surface emitting laser, light having a smaller spectrum width can be emitted.

Details of Embodiments of the Present Disclosure

Hereinafter, embodiments of the present disclosure will be described in detail with reference to the accompanying drawings. In the description of the drawings, the same reference numerals are used for the same or equivalent elements, and overlapping description will be omitted. In the drawings, XYZ coordinate axes are shown as necessary. X axis, Y axis, and Z axis intersect (for example, are orthogonal to) each other.

Figure 2:
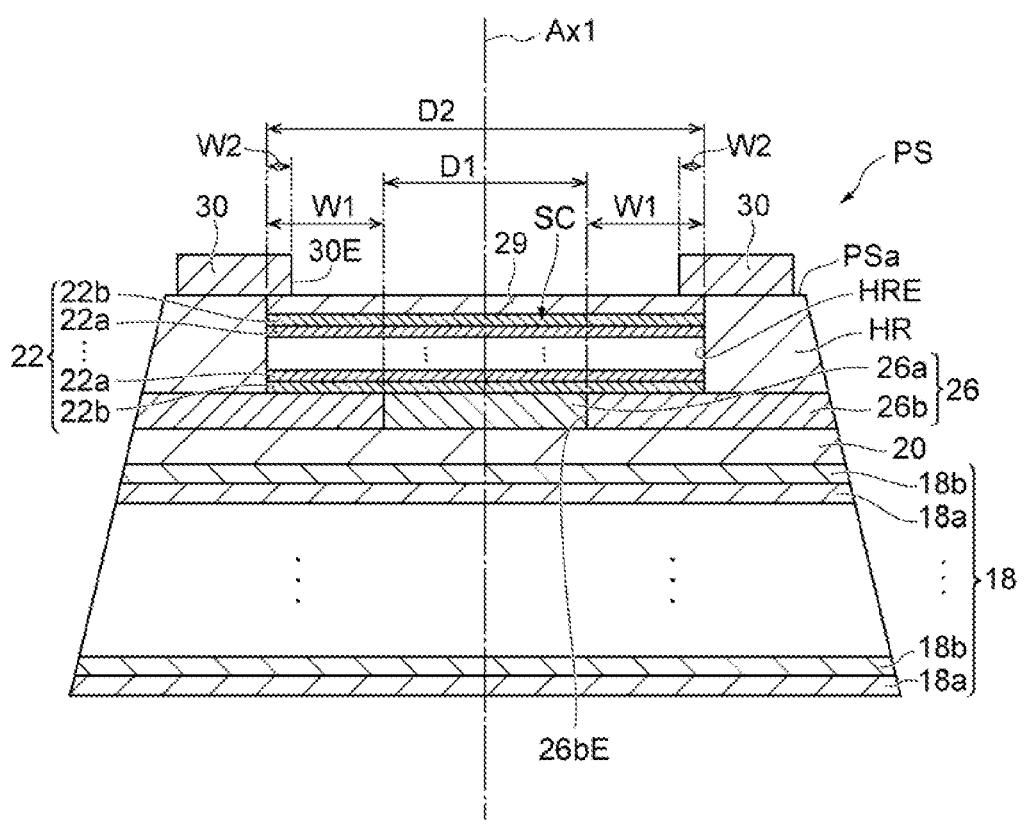
FIG. 2 is an enlarged cross-sectional view of a portion of the vertical cavity surface emitting laser of FIG. 1.
Figure 3:
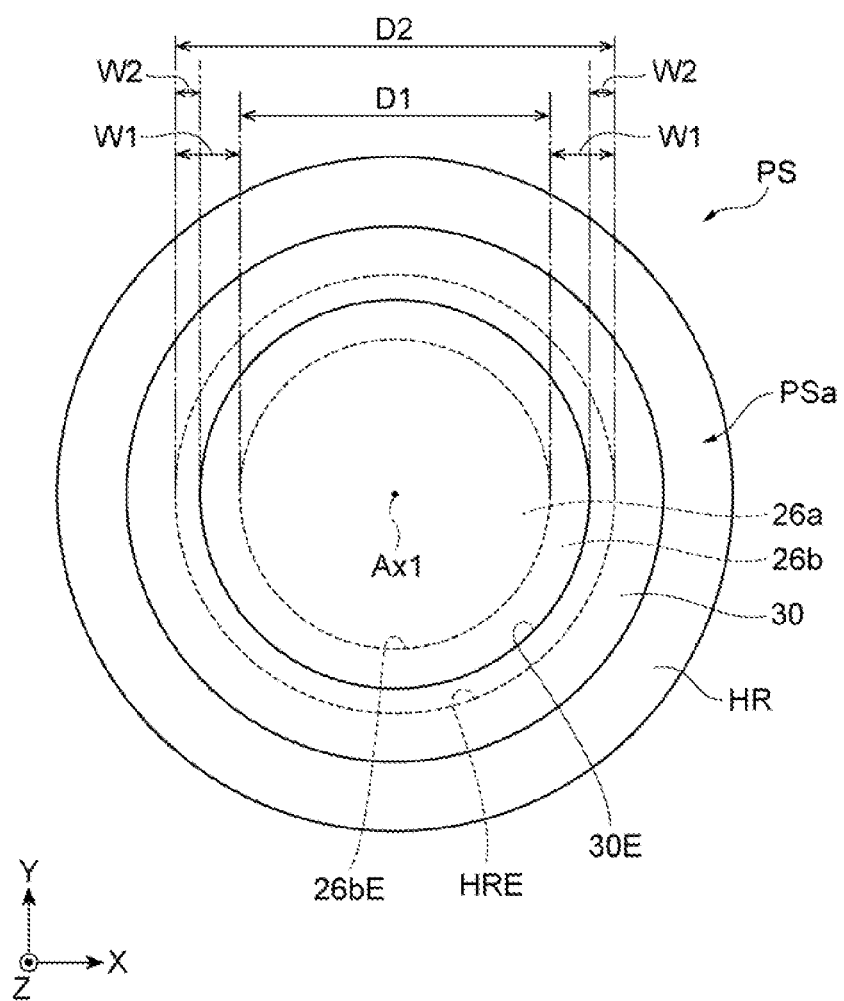
FIG. 3 is a plan view of a portion of the vertical cavity surface emitting laser of FIG. 1.

FIG. 1 is a schematic cross-sectional view of a vertical cavity surface emitting laser according to an embodiment. FIG. 2 is an enlarged cross-sectional view of a portion of the vertical cavity surface emitting laser of FIG. 1. FIG. 3 is a plan view of a portion of the vertical cavity surface emitting laser of FIG. 1. A vertical cavity surface emitting laser (VCSEL) 10 shown in FIG. 1 emits a laser light L. A wavelength of laser light L may be 800 nm to 950 nm.

Vertical cavity surface emitting laser 10 includes a post PS provided on a major surface 12a of a substrate 12, and an electrode 30 provided on an upper surface PSa of post PS. Post PS extends along a first axis Ax1 intersecting major surface 12a of substrate 12. The direction in which first axis Ax1 extends coincides with the Z axis. Electrode 30 surrounds first axis Ax1. Electrode 30 is, for example, a ring-shaped electrode.

Substrate 12 has major surface 12a including a group III-V compound semiconductor. Substrate 12 may be a group III-V compound semiconductor substrate. Substrate 12 may be a substrate including a group III-V compound semiconductor layer and a base substrate. The group III-V compound semiconductor layer has major surface 12a. The base substrate supports the group III-V compound semiconductor layer. The group III-V compound semiconductor includes, for example, GaAs.

Post PS includes a first distributed Bragg reflector 18, an active layer 20, a current confinement layer 26, and a second distributed Bragg reflector 22. Substrate 12, first distributed Bragg reflector 18, active layer 20, current confinement layer 26, and second distributed Bragg reflector 22 are disposed in order in a direction of first axis Ax1.

First distributed Bragg reflector 18 has a first conductivity type (for example, n-type) semiconductor stacked structure. The semiconductor stacked structure includes a semiconductor layer 18a and a semiconductor layer 18b alternately disposed in the direction of first axis Ax1. Semiconductor layer 18a and semiconductor layer 18b have different refractive indices. Semiconductor layer 18a has a lower refractive index than, for example, semiconductor layer 18b. Each of semiconductor layer 18a and semiconductor layer 18b includes group III-V compound semiconductor such as AlGaAs. An example of an n-type dopant is silicon.

Active layer 20 has, for example, a multiple quantum well structure. The multi-quantum well structure may include GaAs layers (or AlGaAs layers) and AlGaAs layers alternately disposed along first axis Ax1.

Current confinement layer 26 includes an aperture portion 26a and an oxidized portion 26b surrounding aperture portion 26a. First axis Ax1 passes through aperture portion 26a. Aperture portion 26a is a second conductivity-type (for example, p-type) semiconductor layer. Aperture portion 26a includes a group III-V compound semiconductor including aluminum as a group III element. Aperture portion 26a includes a group III-V compound semiconductor such as AlGaAs. Oxidized portion 26b includes aluminum oxide. An electrical resistance of aperture portion 26a is lower than an electrical resistance of oxidized portion 26b.

Second distributed Bragg reflector 22 has a second conductivity type (for example, p-type) semiconductor stacked structure. The second conductivity type is a conductivity type opposite to the first conductivity type. The semiconductor stacked structure includes a semiconductor layer 22a and a semiconductor layer 22b alternately disposed in the direction of first axis Ax1. Semiconductor layer 22a and semiconductor layer 22b have different refractive indices. Semiconductor layer 22a has a lower refractive index than, for example, semiconductor layer 22b. Each of semiconductor layer 22a and semiconductor layer 22b includes group III-V compound semiconductor such as AlGaAs.

A contact layer 29 of the second conductivity type (for example, p-type) may be provided on second distributed Bragg reflector 22. Contact layer 29 has upper surface PSa of post PS. Contact layer 29 includes group III-V compound semiconductor such as AlGaAs.

A third distributed Bragg reflector 14 may be provided between substrate 12 and post PS. Third distributed Bragg reflector 14 has, for example, a first conductivity-type (for example, n-type) semiconductor stacked structure. The semiconductor stacked structure may have i-type. The semiconductor stacked structure includes a plurality of semiconductor layers alternately disposed in a direction of first axis Ax1. The plurality of semiconductor layers have different refractive indices. Each semiconductor layer includes group III-V compound semiconductor such as AlGaAs.

A contact layer 16 of the first conductivity type (for example, n-type) may be provided between third distributed Bragg reflector 14 and post PS. Contact layer 16 includes group III-V compound semiconductor such as AlGaAs.

Vertical cavity surface emitting laser 10 may include a semiconductor stacked structure LM provided on major surface 12a of substrate 12. Third distributed Bragg reflector 14 and contact layer 16 are provided between substrate 12 and semiconductor stacked structure LM. Semiconductor stacked structure LM has the same layer structure as post PS. Semiconductor stacked structure LM and post PS are disposed in a direction (for example, the X axis) orthogonal to first axis Ax1. A trench TR surrounding post PS may be formed between semiconductor stacked structure LM and post PS. The bottom of trench TR reaches contact layer 16.

An insulating layer 50 may be provided on semiconductor stacked structure LM, trench TR, and post PS. In upper surface PSa of post PS, insulating layer 50 has a first opening 50a. Electrode 30 is provided in first opening 50a. At the bottom of trench TR, insulating layer 50 has a second opening 50b. An electrode 40 is provided in second opening 50b.

Electrode 30 is in ohmic contact with upper surface PSa of post PS. A wiring 32 may be electrically connected to electrode 30. Wiring 32 extends from upper surface PSa of post PS to semiconductor stacked structure LM beyond trench TR.

Electrode 40 is in ohmic contact with contact layer 16. A wiring 42 may be electrically connected to electrode 40. Wiring 42 extends from trench TR to semiconductor stacked structure LM.

Second distributed Bragg reflector 22 includes a semiconductor region SC and a high-resistance region HR. Semiconductor region SC includes semiconductor layer 22a and semiconductor layer 22b. High-resistance region HR has a higher electrical resistance than semiconductor region SC. Each of high-resistance regions HR may include ions. Examples of ions include protons. High-resistance region HR includes crystal defects generated by ion implantation. High-resistance region HR may include the same semiconductor material as semiconductor region SC. First axis Ax1 passes through the center of semiconductor region SC. The center of semiconductor region SC may be a center of gravity of a section shape of semiconductor region SC orthogonal to first axis Ax1. When the sectional shape of semiconductor region SC orthogonal to first axis Ax1 includes an circular arc, the center of semiconductor region SC may be the center of the circular arc. High-resistance region HR surrounds semiconductor region SC and first axis Ax1. High-resistance region HR is, for example, a ring-shaped region.

High-resistance region HR may be formed in contact layer 29. High-resistance region HR may be formed in a portion of current confinement layer 26, semiconductor layer 22b, active layer 20, and first distributed Bragg reflector 18.

As shown in FIGS. 2 and 3, high-resistance region HR has an inner edge HRE that is positioned farther away than an inner edge 30E of electrode 30 from first axis Ax1 in a direction (for example, the X-axis) orthogonal to first axis Ax1. Inner edge HRE may be in contact with semiconductor region SC. Oxidized portion 26b has an inner edge 26bE located closer to first axis Ax1 than inner edge 30E of electrode 30 in a direction (for example, the X axis) orthogonal to first axis Ax1. Inner edge 26bE may be in contact with aperture portion 26a.

In a section (for example, an XY section) orthogonal to first axis Ax1, the longest line segment of line segments connecting any two points on inner edge 26bE of oxidized portion 26b has a length D1. When inner edge 26bE of oxidized portion 26b is a circle in the section orthogonal to first axis Ax1, length D1 is a diameter of the circle. Length D1 may be a maximum length of aperture portion 26a in a direction orthogonal to first axis Ax1. The value of length D1 may be from 4 μm to 7 μm.

In a section (for example, an XY section) orthogonal to first axis Ax1, the longest line segment of line segments connecting any two points on inner edge HRE of high-resistance region HR has a length D2. When inner edge HRE of high-resistance region HR is a circle in the section orthogonal to first axis Ax1, length D2 is a diameter of the circle. Length D2 may be the maximum length of semiconductor region SC in a direction orthogonal to first axis Ax1. The XY section having length D2 can be acquired at a position closest to current confinement layer 26 in the direction of first axis Ax1. The value of length D2 may be from 5 μm to 13 μm.

The value of D2/D1 may be greater than 1 and is 2.5 or less. The value of D2/D1 is the ratio of length D1 to length D2. The value of D2/D1 may be 1.1 or greater. The value of D2/D1 may be 2 or less.

A distance W1 between inner edge 26bE of oxidized portion 26b and inner edge HRE of high-resistance region HR in a direction (for example, the X-axis) orthogonal to first axis Ax1 may be equal to a value of (D2−D1)/2. Distance W1 may be a distance between a lower end of inner edge HRE of high-resistance region HR (a position closest to current confinement layer 26) and inner edge HRE of high-resistance region HR. Distance W1 may be 3 μm or less, less than 3 μm, 2.5 μm or less, or 2.25 μm or less. Distance W1 may be 0.5 μm or greater.

A distance W2 between inner edge 30E of electrode 30 and inner edge HRE of high-resistance region HR in a direction (for example, the X-axis) orthogonal to first axis Ax1 may be equal to or less than distance W1. Distance W2 may be 3 µm or less, less than 3 µm, 2.5 µm or less, or 2.25 µm or less. Distance W2 may be 0.5 µm or greater.

According to vertical cavity surface emitting laser 10, it is possible to reduce distance W1 between inner edge 26bE of oxidized portion 26b and inner edge HRE of high-resistance region HR in the direction (for example, the X-axis) orthogonal to first axis Ax1. Since high-resistance region HR absorbs light more easily than semiconductor region SC, high-resistance region HR can absorb a transverse mode (particularly, a higher-order mode) generated at a position away from first axis Ax1 (a position farther from first axis Ax1 than inner edge 26bE). The transverse mode increases the spectrum width of laser light L emitted from vertical cavity surface emitting laser 10. Therefore, according to vertical cavity surface emitting laser 10, laser light L having a smaller spectrum width can be emitted. Further, when distance W1 is small, the current is concentrated in the vicinity of aperture portion 26a by high-resistance region HR.

When the value of D2/D1 is 1.1 or greater, it is possible to prevent distance W1 from becoming excessively small. Therefore, absorption of the fundamental mode generated at the position of first axis Ax1 or at a position close to first axis Ax1 by high-resistance region HR can be suppressed.

Hereinafter, various experiments performed to evaluate laser light emitted from a vertical cavity surface emitting laser will be described. The present disclosure is not limited to experiments described below.

In the first experiment and the second experiment, a vertical cavity surface emitting laser having the same configuration as post PS shown in FIGS. 2 and 3 was prepared. In the first experiment, distance W1 is 2.25 µm. Distance W2 is 0.75 µm. The value of D1 is 5 µm. The value of D2 is 9.5 µm. The value of D2/D1 is 1.9. In the second experiment, distance W1 is 6 µm. Distance W2 is 3 µm. The value of D1 is 5 µm. The value of D2 is 17 µm. The value of D2/D1 is 3.4.

Spectra of laser light emitted by applying an 8 mA driving current to the vertical cavity surface emitting lasers of the first experiment and the second experiment were measured. The spectra were measured using an optical spectrum analyser with a resolution of 0.02 nm.

Figure 4:
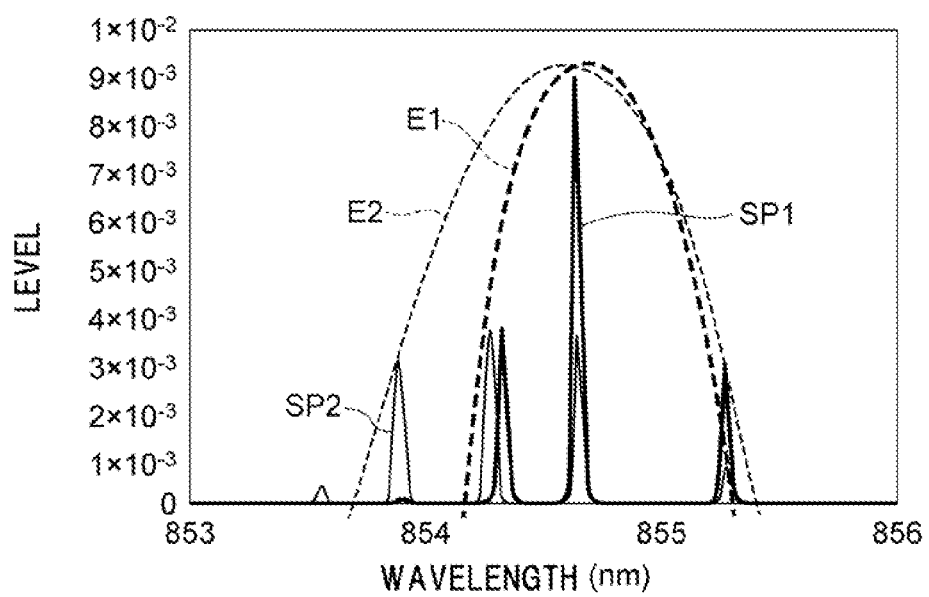
FIG. 4 is a graph showing an example of a spectrum of light emitted from a vertical cavity surface emitting laser.

FIG. 4 is a graph showing a spectrum of light emitted from the vertical cavity surface emitting laser of the first experiment and the second experiment. The vertical axis in FIG. 4 represents the level (relative intensity) of the emitted light. The horizontal axis represents wavelength (nm). A spectrum SP1 represents a spectrum of laser light emitted from the vertical cavity surface emitting laser of the first experiment. An envelope E1 connects the peaks of spectrum SP1. A spectrum SP2 represents a spectrum of laser light emitted from the vertical cavity surface emitting laser of the second experiment. An envelope E2 connects the peaks of spectrum SP2. As shown in FIG. 4, in spectrum SP1, the peak of the higher-order mode (peak in the vicinity of the wavelength 854 nm) is smaller than that in spectrum SP2.

A spectrum width $\Delta\lambda_{RMS}$ was calculated from spectra SP1 and SP2 using the following Formula 1. $\lambda_i$ represents the wavelength of each peak. Pi represents the intensity of each peak. $P_{tot}$ represents the sum value of the intensities of all peaks.

$$\Delta\lambda_{RMS} = \sqrt{\sum_{i=1}^{n} \frac{P_i}{P_{tot}} (\lambda_i - \lambda_{mean})^2}, \quad \text{[Formula 1]}$$

$$\lambda_{mean} = \sum_{i=1}^{n} \frac{P_i}{P_{tot}} \lambda_i$$

Spectrum width $\Delta\lambda_{RMS}$ of spectrum SP1 was about 0.3 nm. Spectrum width $\Delta\lambda_{RMS}$ of spectrum SP2 was 0.4 nm.

Vertical cavity surface emitting lasers of the third experiment to the ninth experiment having the same configuration as that of the first experiment except that distances W1 and W2 were changed were prepared.

In the third experiment, distance W1 is 1.25 µm. Distance W2 is 0.25 µm. The value of D2 is 7.5 µm. The value of D2/D1 is 1.5.

In the fourth experiment, distance W1 is 1.5 µm. Distance W2 is 0.5 µm. The value of D2 is 8 µm. The value of D2/D1 is 1.6.

In the fifth experiment, distance W1 is 1.75 µm. Distance W2 is 0.25 µm. The value of D2 is 8.5 µm. The value of D2/D1 is 1.7.

In the sixth experiment, distance W1 is 2 µm. Distance W2 is 0.5 µm. The value of D2 is 9 µm. The value of D2/D1 is 1.8.

In the seventh experiment, distance W1 is 2.5 µm. Distance W2 is 1 µm. The value of D2 is 10 µm. The value of D2/D1 is 2.0.

In the eighth experiment, distance W1 is 3 µm. Distance W2 is 1.5 µm. The value of D2 is 11 µm. The value of D2/D1 is 2.2.

In the ninth experiment, distance W1 is 4 µm. Distance W2 is 1 µm. The value of D2 is 13 µm. The value of D2/D1 is 2.6.

For the vertical cavity surface emitting lasers of the third experiment to the ninth experiment, the spectrum width of the laser light was calculated in the same manner as in the first experiment and the second experiment.

Figure 5:
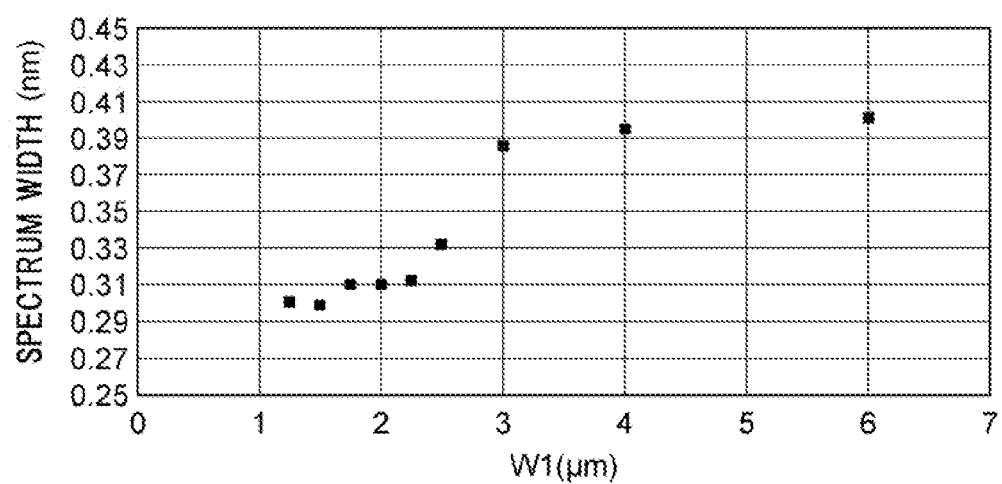
FIG. 5 is a graph showing an example of a relationship between a spectrum width and a distance between an inner edge of an oxidized portion and an inner edge of a high-resistance region.

FIG. 5 is a graph showing the relationship between distance W1 and spectrum width in the first experiment to the ninth experiment. The horizontal axis in FIG. 5 represents distance W1 (µm). The vertical axis represents the spectrum width (nm). As shown in FIG. 5, it can be seen that the spectrum width decreases as distance W1 decreases. In particular, when distance W1 is less than 3 µm, the spectrum width is significantly reduced. In addition, when the value of D2/D1 is 2.5 or less, it can be seen that the spectrum bandwidth is reduced.

Figure 6:
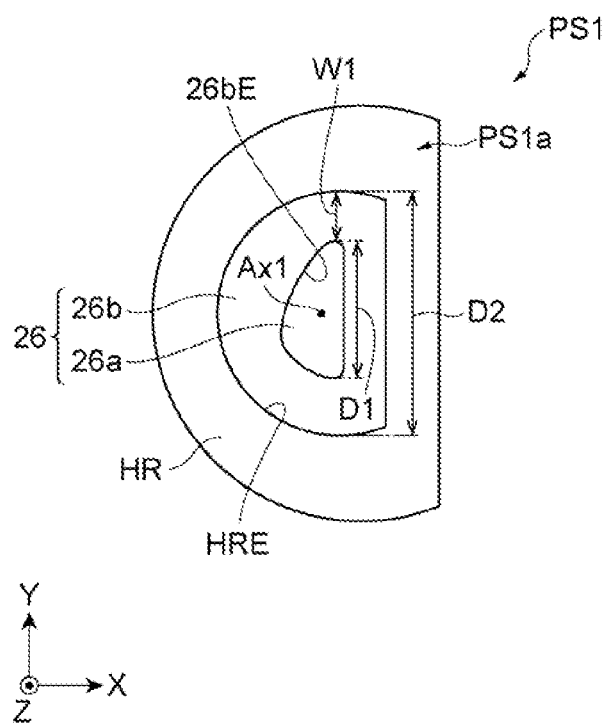
FIG. 6 is a plan view showing a post according to the first variation.

FIG. 6 is a plan view showing the post according to the first modification. Vertical cavity surface emitting laser 10 of FIG. 1 may include a post PS1 shown in FIG. 6 instead of post PS. Post PS1 has the same configuration as post PS except that the shape of a section orthogonal to first axis Ax1 is different. FIG. 6 shows an upper surface PS1a of post PS1. However, electrode 30 and semiconductor region SC are omitted. Post PS1 has a monoaxially symmetric shape in a section orthogonal to first axis Ax1, but may have an asymmetric shape. Post PS1 may have an outer shape including an circular arc and a straight line connecting both ends of the circular arc in a section orthogonal to first axis Ax1. Inner edge HRE of high-resistance region HR may have a similar shape as a shape of post PS1 in a section orthogonal to first axis Ax1. Inner edge 26bE of oxidized portion 26b may have an asymmetric shape in a section orthogonal to first axis Ax1. Inner edge 26bE of oxidized portion 26b may have a triangular shape with rounded corners. In a section orthogonal to first axis Ax1, the longest line segment of line segments connecting any two points on inner edge 26bE of oxidized portion 26b has length D1. In the present modification, length D1 is, for example, a length along the Y-axis. In a section orthogonal to first axis Ax1, the longest line segment of line segments connecting any two points on inner edge HRE of high-resistance region HR has length D2. In the present modification, length D2 is, for example, a length along the Y-axis. The value of D2/D1 is greater than 1 and is 2.5 or less.

Even when vertical cavity surface emitting laser 10 includes post PS1, since distance W1 can be reduced, laser light L having a smaller spectrum width may be emitted.

Figure 7:
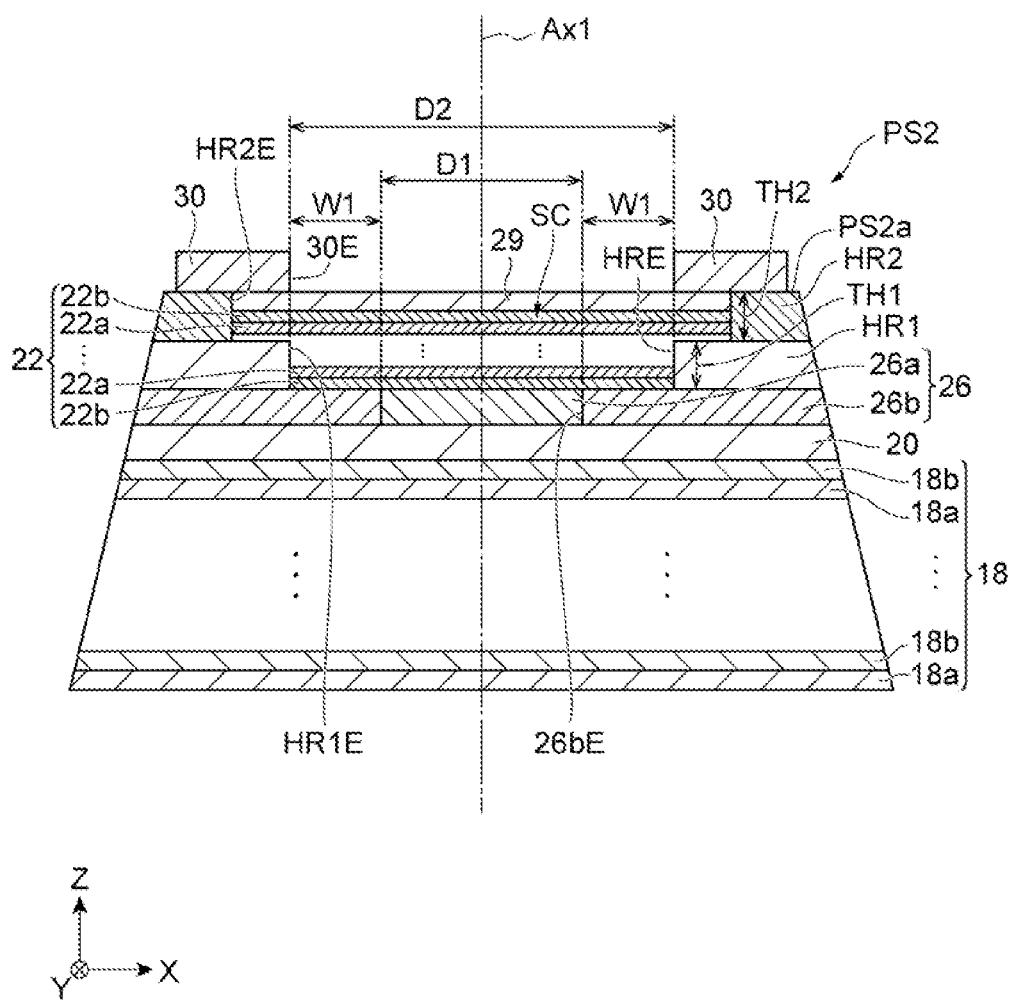
FIG. 7 is a sectional view showing a post according to the second variation.

FIG. 7 is a sectional view showing the post according to the second modification. Vertical cavity surface emitting laser 10 of FIG. 1 may include a post PS2 shown in FIG. 7 instead of post PS. Post PS2 has the same configuration as that of vertical cavity surface emitting laser 10 except that a first high-resistance region HR1 and a second high-resistance region HR2 are provided instead of high-resistance region HR.

The electrical resistance of first high-resistance region HR1 and the electrical resistance of second high-resistance region HR2 are higher than the electrical resistance of semiconductor region SC. Each of first high-resistance region HR1 and second high-resistance region HR2 may include the same material as high-resistance region HR. First high-resistance region HR1 and second high-resistance region HR2 surround semiconductor region SC and first axis Ax1. First high-resistance region HR1 and second high-resistance region HR2 are, for example, ring-shaped regions.

Second high-resistance region HR2 may be disposed between electrode 30 and first high-resistance region HR1 in the direction of first axis Ax1. Second high-resistance region HR2 is positioned closer to an upper surface PS2a of post PS2 than first high-resistance region HR1. Specifically, second high-resistance region HR2 is formed at a shallower position than first high-resistance region HR1 from upper surface PS2a. A lower surface of second high-resistance region HR2 may be in contact with an upper surface of first high-resistance region HR1.

First high-resistance region HR1 has an inner edge HR1E at the same position as inner edge 30E of electrode 30 in a direction (for example, the X-axis) orthogonal to first axis Ax1. Inner edge HR1E may be in contact with semiconductor region SC. Second high-resistance region HR2 has an inner edge HR2E that is positioned farther away than inner edge HR1E of first high-resistance region HR1 from first axis Ax1 in a direction (for example, the X-axis) orthogonal to first axis Ax1. Inner edge HR2E may be in contact with semiconductor region SC.

First high-resistance region HR1 and second high-resistance region HR2 respectively have a first thickness TH1 and a second thickness TH2 along the direction of first axis Ax1. Second thickness TH2 is smaller than first thickness TH1. First thickness TH1 is, for example, from 3 μm to 5 μm. Second thickness TH2 is, for example, from 1 μm to 2 μm.

In a section (for example, an XY section) orthogonal to first axis Ax1, the longest line segment of line segments connecting any two points on inner edge HR1E of first high-resistance region HR1 has length D2. The value of D2/D1 is greater than 1 and is 2.5 or less. Distance W1 between inner edge 26bE of oxidized portion 26b and inner edge HR1E of first high-resistance region HR1 is the same as distance W1 between inner edge 26bE of oxidized portion 26b and inner edge HRE of high-resistance region HR.

Even when vertical cavity surface emitting laser 10 includes post PS2, distance W1 may be reduced, and thus laser light L having a smaller spectrum width may be emitted. Further, since second high-resistance region HR2 is positioned father away from first axis Ax1, the conduction area between electrode 30 and semiconductor region SC can be increased.

Although the preferred embodiments of the present disclosure have been described in detail, the present disclosure is not limited to the above embodiments.

It should be understood that the embodiments disclosed herein are illustrative and non-restrictive in every respect. The scope of the present invention is defined not by the above description but by the claims, and is intended to include all modifications within the scope and meaning equivalent to the claims.

What is claimed is:

1. A vertical cavity surface emitting laser comprising:
a post provided at a major surface of a substrate and extending along a first axis intersecting the major surface of the substrate; and
an electrode provided at an upper surface of the post and surrounding the first axis,
wherein:
the post includes a first distributed Bragg reflector, an active layer, a current confinement layer, and a second distributed Bragg reflector,
the substrate, the first distributed Bragg reflector, the active layer, the current confinement layer, and the second distributed Bragg reflector are disposed in order in a direction of the first axis,
the second distributed Bragg reflector includes a semiconductor region and a first high-resistance region surrounding the semiconductor region,
the first high-resistance region has an electrical resistance that is higher than an electrical resistance of the semiconductor region,
the current confinement layer includes an aperture portion and an oxidized portion surrounding the aperture portion,
the first axis passes through the semiconductor region and the aperture portion,
a length of a longest line segment of line segments connecting any two points on an inner edge of the oxidized portion in a section orthogonal to the first axis is D1, a length of a longest line segment of line segments connecting any two points on an inner edge of the first high-resistance region in the section orthogonal to the first axis is D2, and a value of D2/D1 is greater than 1 and is 2.5 or less,
the second distributed Bragg reflector includes a second high-resistance region having an electrical resistance that is higher than the electrical resistance of the first high-resistance region,
the second high-resistance region surrounds the semiconductor region,
the second high-resistance region is disposed between the electrode and the first high-resistance region in the direction of the first axis,
the second high-resistance region has an inner edge that is positioned farther away than an inner edge of the first high-resistance region from the first axis in a direction orthogonal to the first axis, and
the first high-resistance region and the second high-resistance region respectively have a first thickness and a second thickness along the direction of the first axis, the second thickness being smaller than the first thickness.

2. The vertical cavity surface emitting laser according to claim 1, wherein the value of D2/D1 is 1.1 or greater.

3. The vertical cavity surface emitting laser according to claim 1, wherein a value of D1 is from 4 μm to 7 μm.

4. The vertical cavity surface emitting laser according to claim 1, wherein, in a direction orthogonal to the first axis, a distance between the inner edge of the oxidized portion and the inner edge of the first high-resistance region is 3 μm or less.

5. A vertical cavity surface emitting laser comprising:
a post provided at a major surface of a substrate and extending along a first axis intersecting the major surface of the substrate; and
an electrode provided at an upper surface of the post and surrounding the first axis,
wherein;
the post includes a first distributed Bragg reflector, an active layer, a current confinement layer, and a second distributed Bragg reflector,
the substrate, the first distributed Bragg reflector, the active layer, the current confinement layer, and the second distributed Bragg reflector are disposed in order in a direction of the first axis,
the second distributed Bragg reflector includes a semiconductor region and a first high-resistance region surrounding the semiconductor region,
the first high-resistance region has an electrical resistance that is higher than an electrical resistance of the semiconductor region,
the current confinement layer includes an aperture portion and an oxidized portion surrounding the aperture portion,
the first axis passes through the semiconductor region and the aperture portion,
in a direction orthogonal to the first axis, a distance between an inner edge of the oxidized portion and an inner edge of the first high-resistance region is 3 μm or less,
the second distributed Bragg reflector includes a second high-resistance region having an electrical resistance that is higher than the electrical resistance of the first high-resistance region,
the second high-resistance region surrounds the semiconductor region,
the second high-resistance region is disposed between the electrode and the first high-resistance region in the direction of the first axis,
the second high-resistance region has an inner edge that is positioned farther away than an inner edge of the first high-resistance region from the first axis in a direction orthogonal to the first axis, and
the first high-resistance region and the second high-resistance region respectively have a first thickness and a second thickness along the direction of the first axis, the second thickness being smaller than the first thickness.

* * * * *